US012603504B2

(12) United States Patent
Kumar et al.

(10) Patent No.: US 12,603,504 B2
(45) Date of Patent: Apr. 14, 2026

(54) IN RELATION TO DYNAMIC BRAKING SYSTEMS FOR BIPOLE POWER TRANSMISSION NETWORKS

(71) Applicant: GE Infrastructure Technology LLC, Greenville, SC (US)

(72) Inventors: Amit Kumar, Stafford (GB); Carl Barker, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 231 days.

(21) Appl. No.: 18/659,298

(22) Filed: May 9, 2024

(65) Prior Publication Data

US 2024/0396340 A1      Nov. 28, 2024

(30) Foreign Application Priority Data

May 26, 2023    (EP) ..................................... 23175754

(51) Int. Cl.
H02J 3/36        (2026.01)
H02J 3/001       (2026.01)
(Continued)

(52) U.S. Cl.
CPC ........... H02J 3/36 (2013.01); H02J 3/00125 (2020.01); H02M 1/325 (2021.05); H02M 7/4835 (2021.05); *H02J 2101/28* (2026.01)

(58) Field of Classification Search
CPC ...... H02J 3/36; H02J 3/00; H02J 3/001; H02J 3/00125; H02J 2101/28; H02J 2300/28;
(Continued)

(56) References Cited

U.S. PATENT DOCUMENTS

| | | | | |
|---|---|---|---|---|
| 9,973,004 B2 * | 5/2018 | Holmgren | ................. | H02J 3/36 |
| 10,284,080 B2 * | 5/2019 | Barthold | ............. | H02M 3/1584 |

(Continued)

FOREIGN PATENT DOCUMENTS

| | | | | |
|---|---|---|---|---|
| CN | 113629755 A | * 11/2021 | ................ | H02J 3/36 |
| WO | 2013068031 A1 | 5/2013 | | |

OTHER PUBLICATIONS

Machine translation CN-113629755-A (Year: 2021).*

(Continued)

*Primary Examiner* — Thienvu V Tran
*Assistant Examiner* — Yahveh Comas Torres
(74) *Attorney, Agent, or Firm* — Eversheds Sutherland (US) LLP

(57) ABSTRACT

A dynamic braking system for a bipole power transmission network including a first dynamic braking unit and a second dynamic braking unit connectable, respectively, between a first transmission pole and a neutral arrangement, and a second transmission pole and a neutral arrangement, of a bipole power transmission network. The dynamic braking system includes a controller configured to determine, based on an operating state of the bipole power transmission network, whether a third current equal to the difference between first and second currents flowing through the first and second dynamic braking units, can flow through the neutral arrangement. The controller is configured to operate the dynamic braking units independently if the third current is permitted to flow, and in coordination with each-other, to balance the first and second currents such that the third current is substantially zero, if the third current is not permitted to flow through the neutral arrangement.

15 Claims, 6 Drawing Sheets

(51) Int. Cl.
　　*H02J 101/28* 　　　(2026.01)
　　*H02M 1/32* 　　　(2007.01)
　　*H02M 7/483* 　　　(2007.01)

(58) Field of Classification Search
　　CPC ...... H02J 2300/20; H02M 1/32; H02M 1/325;
　　　　　　H02M 7/4835; H02M 5/40; H02H 9/02
　　See application file for complete search history.

(56) References Cited

U.S. PATENT DOCUMENTS

| | | | | |
|---|---|---|---|---|
| 10,374,412 | B2 * | 8/2019 | Nyberg | H02H 7/1203 |
| 10,447,028 | B2 * | 10/2019 | Gupta | H02H 7/1216 |
| 10,673,230 | B2 * | 6/2020 | Gupta | H02H 3/06 |
| 11,005,266 | B2 * | 5/2021 | Gupta | H02H 3/087 |
| 11,837,867 | B2 * | 12/2023 | Sonnathi | H02H 7/268 |
| 11,971,440 | B2 * | 4/2024 | Rajapakse | G01R 31/085 |
| 2009/0316446 | A1 * | 12/2009 | Astrom | H02H 7/268 |
| | | | | 363/35 |
| 2012/0092904 | A1 * | 4/2012 | Nuqui | H02J 3/36 |
| | | | | 363/35 |
| 2012/0201059 | A1 * | 8/2012 | Berggren | H02J 3/36 |
| | | | | 363/53 |
| 2012/0228949 | A1 * | 9/2012 | Norman | H02H 3/087 |
| | | | | 363/53 |
| 2013/0256109 | A1 * | 10/2013 | Marquardt | H02H 3/087 |
| | | | | 200/5 A |
| 2018/0109109 | A1 * | 4/2018 | Holmgren | H02J 1/06 |
| 2018/0166983 | A1 * | 6/2018 | Barthold | H02M 3/06 |
| 2018/0287371 | A1 * | 10/2018 | Nyberg | H02J 3/36 |
| 2021/0382103 | A1 * | 12/2021 | Rajapakse | G01R 31/085 |
| 2022/0360161 | A1 * | 11/2022 | Adamczyk | H02J 1/102 |

OTHER PUBLICATIONS

Barral: An investigation of an energy diverting converter for HVDC applications. Knowledge Base Article, Mar. 1, 2019 (Mar. 1, 2019), pp. 23, 28, 31, 35, 38-39, 177, XP093101127, Article ID: NK-1000-0675 (Year: 2019).*

Extended European Search Report issued in EP Application No. 23175754.3 dated Nov. 15, 2023, 16 pages.

Barral: An investigation of an energy diverting converter for HVDC applications. Knowledge Base Article, Mar. 1, 2019 (Mar. 1, 2019), pp. 23, 28, 31, 35, 38-39, 177, XP093101127, Article ID: NK-1000-0675, Retrieved from the Internet: URL:https://core.ac.uk/download/pdf/227455996.pdf [retrieved on Nov. 14, 2023].

Wang: Pole rebalancing methods for pole-to-ground faults in symmetrical monopolar HVDC grids. IEEE Transactions on Power Delivery 34 (2019): 188-197.

IEC: TS 63291-2 ED1: HVDC Grid Systems and connected Converter Stations—Guideline and Parameter Lists for Functional Specifications—br/Part 2: Parameter Lists, Jul. 22, 2022 (Jul. 22, 2022), pp. 1-81, XP082036906, Retrieved from the Internet: URL:https://aou,ued,ch/harmonized/documents/download/3031198 [retrieved on Jul. 22, 2022].

* cited by examiner

100

140    110    110b          130          120b    120    150

110a                              120a

IN RELATION TO DYNAMIC BRAKING SYSTEMS FOR BIPOLE POWER TRANSMISSION NETWORKS

TECHNICAL FIELD

The subject matter herein relates generally to the field of bipole power transmission networks and more specifically to dynamic braking systems for bipole power transmission networks.

BACKGROUND

In high voltage direct current (HVDC) power transmission networks, alternating current (AC) power is typically converted to direct current (DC) power for transmission via overhead lines, under-sea cables and/or underground cables. This conversion removes the need to compensate for the AC reactive/capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks, for instance.

The conversion between DC power and AC power is utilized where it is necessary to interconnect DC and AC networks. In any such power transmission network, power conversion means also known as converters (i.e. power converters in converter stations) are required at each interface between AC and DC power to effect the required conversion from AC to DC or from DC to AC.

The choice of the most suitable HVDC power transmission network or scheme depends on the particular application and scheme features. Examples of power transmission networks include monopole power transmission networks and bipole power transmission networks.

More specifically, in a bipole power transmission network, a sending converter station and a receiving converter station both comprise first and second converters. The DC side of the first converter of the sending converter station is connected, via a transmission medium, to the DC side of the first converter of the receiving converter station, to define a first DC electrical transmission pole. The DC side of the second converter of the sending converter station is connected, via a transmission medium, to the DC side of the second converter of the receiving converter station, to define a second DC electrical transmission pole. A common neutral arrangement may also be provided, interconnecting the first and second converter stations, which may itself comprise a dedicated metallic return (DMR) conductor.

Bipole power transmission networks are often deployed with renewable power generation networks, and more specifically, offshore wind parks. In large scale off-shore wind parks the generated power is often imported to the mainland via such an HVDC transmission link. These off-shore grids can however be sensitive to transient disturbances because the power generation is unable to adapt to such events. Measures are therefore required to be incorporated into the HVDC power transmission network in order to increase the stability of the wind park and the DC transmission voltage.

SUMMARY

During normal operation of a bipole power transmission network, if the DC currents flowing through the first and second electrical transmission poles are equal, the DC current on the neutral arrangement (and the DMR conductor) is zero. However, in bipole power transmission networks transmitting power from renewable-power generation networks (such as wind farms), it is not uncommon for the two transmission poles of a bipole scheme to be fed from independent wind power parks. The different wind power parks can produce different power outputs depending on, for instance, the wind density in the vicinity of the power parks. This results in an unbalanced power flow between the two poles causing an unbalanced current flowing through the neutral arrangement and the DMR.

Traditional network integrated HVDC transmission systems and HVDC systems utilizing power from traditional synchronous generators (for instance conventional thermal or hydro-electric generation) may be capable of 'riding through' temporary load rejections on the HVDC link by virtue of the inherent inertia within the AC system. This is not applicable to all power generation networks such as wind parks, and hence, additional energy dissipation systems, known as dynamic braking systems (DBS), are utilized to keep the power generation system stable.

A DBS is a form of energy dissipation system that utilizes a resistive circuit to divert excess energy, giving a temporary disturbance ride-through capability. A DBS will typically regulate the power dissipated in a fixed resistance, with a separate DBS provided and independently controlled for each DC transmission pole of a bipole transmission network. Hence, during a transient event, the respective DBS' can be operated independently according to fault ride-through profiles defined by national grid codes. Any remaining unbalanced current through the DBS' can be allowed to flow through the DMR.

Problems can arise, however, with independent control of the DBS' in a bipole power transmission network. When a DMR conductor is not available (for instance owing to loss of the DMR or a fault), and current on the neutral arrangement is not desirable, the bipole power transmission network should be switched to either a rigid bipole or a bipole with both converter stations grounded. In either mode, it is desirable to reduce the unbalanced current (i.e. the current that would flow on the neutral arrangement) to zero. This is to mitigate against the DBS operation tripping the power transmission scheme; current flowing through ground causing environmental issues; and/or current flowing through surge arrestors on the neutral arrangement causing excess energy dissipation and raising the neutral potential (also tripping the scheme). The reduction of the return path current to zero cannot be controlled if the DBS' are operating independently.

Hence, it is desirable to provide a dynamic braking system for a bipole power transmission network that mitigates these issues.

According to a first aspect of the invention there is provided a dynamic braking system for a bipole power transmission network, the dynamic braking system comprising: a first dynamic braking unit electrically connectable between a first transmission pole and a neutral arrangement of a bipole power transmission network, wherein the first dynamic braking unit is controllable in-use to regulate a first electrical current flowing between the first transmission pole and the neutral arrangement through the first dynamic braking unit; a second dynamic braking unit electrically connectable between a second transmission pole and the neutral arrangement of the bipole power transmission network, wherein the second dynamic braking unit is controllable in-use to regulate a second electrical current flowing between the second transmission pole and the neutral arrangement through the second dynamic braking unit; and a controller arranged in operative communication with the first and second dynamic braking units, the controller being configured to: determine an operating state of the bipole power transmission network; determine, based on the operating state, whether a third current, equal to a difference between the first and second currents, is permitted to flow through the neutral arrangement of the bipole power transmission network; and control the first and second dynamic braking units to: operate independently of each other, if the third current is determined to be permitted to flow through the neutral arrangement; operate in coordination with each other to balance the first current with the second current, such that the third current is substantially zero, if the third current is determined not to be permitted to flow through the neutral arrangement.

The controller determines the operational state of the bipole power transmission network in which the dynamic braking system is being used. Based on the operational state, the controller determines whether a current (the third current) is permitted to flow through the neutral arrangement. In circumstances where the operational state allows an unbalanced current to flow, the dynamic braking units are operated independently and any unbalanced current (the third current) flows through the neutral arrangement (for instance through a DMR path). However, in circumstances where the operational state does not allow an unbalanced current to flow, the dynamic braking units are operated in a coordinated manner to reduce or minimize the difference in current (the difference between the first and second currents) between the first and second dynamic braking units to close to zero, such that substantially no unbalanced current can flow through the neutral arrangement. This tends to avoid the scenario that currently exists in the prior art, wherein a loss/fault in a return path causes unbalanced current in a transient event to flow through the neutral arrangement to ground or through a surge arrestor, causing environmental harm or tripping the HVDC transmission scheme entirely.

In some embodiments, the controller is configured to control the first and second dynamic braking units in response to an activation trigger received from a monitoring unit of the bipole power transmission network.

Controlling the dynamic braking units in response to an activation trigger tends to ensure the dynamic braking system operates only when required. For instance, the monitoring unit may monitor the bipole power transmission network for temporal events in the connected AC network (for instance a power generation network). Temporal events that may trigger a dynamic braking system include temporary faults in the connected AC network; receipt of emergency power control commands; and/or when an overvoltage at a transmission pole is detected. In the event of such a temporary event being detected, the dynamic braking system may be activated using the activation signal.

In some embodiments, the operating state of the bipole power transmission network comprises: a failure of an electrical component on the neutral arrangement; an open or closed state of a switchgear on the neutral arrangement; a measured electric quantity of the bipole power transmission network; and/or a user input from a user interface of the bipole power transmission network.

There are particular scenarios where it is desirable to not allow an unbalanced current (the third current) to flow through a neutral arrangement of a bipole power transmission network. A failure of, for instance, the metallic return path could result in any unbalanced current flowing to ground or through other components, such as surge arrestors, causing environmental issues or raising of the neutral potential of the neutral arrangement, tripping the bipole power transmission scheme. Additionally and related, is that a DMR path itself may not have failed, but a switchgear, such as the neutral switchgear (referred to in the art as MRTB) may be in an open-state such that unbalanced current cannot flow through a return path (and hence would flow elsewhere through the neutral arrangement). Furthermore, it may be that certain measured electric quantities on either transmission pole or the neutral arrangement, indicate an unbalanced current flow is not permitted. For instance, a significant current imbalance between the first and second electrical poles owing to a temporal event could result in an unbalanced current (the third current) greater than a current limit tolerable on the neutral arrangement. Related is that current measurements on the neutral arrangement or the first and second transmission poles, for instance, can be used in a feedback mechanism to inform the controller as to whether dynamic braking is effective or needs to be dynamically adapted. It can also be the case that a user or operator may intervene in the operation of a bipole power transmission network if the potential for a current imbalance is envisaged. Hence it is important, in some embodiments, for the controller to also be able to receive a user input or intervention to effect dynamic braking appropriately.

In some embodiments, the first and second dynamic braking units provide respective first and second voltages controllable by the controller, for regulating the first and second currents.

The first and second dynamic braking units generate back-emf voltages. These voltages and the equivalent resistances of the first and second dynamic braking units, are mathematically related to the first and second currents. By rendering the first and second voltages controllable by the controller, it tends to be possible for the first and second currents to be regulated such that the third current on the neutral arrangement can be reduced to zero.

In some embodiments, the first and second dynamic braking units comprise respective first and second pluralities of switching devices and first and second pluralities of associated capacitors, wherein the first and second pluralities of switching devices are controllable in response to respective first and second control signals to switch the first and second pluralities of capacitors in order to provide the first and second voltages.

By providing dynamic braking units comprising a plurality of capacitors and associated switching devices, the dynamic braking units can be managed as a controllable voltage source by switching in and bypassing the appropriate number of capacitors to achieve a desired voltage across the dynamic braking units.

In some embodiments, the controller is configured to control the first and second dynamic braking units by providing the first and second control signals. In some embodiments, the first and second control signals comprise respective first and second reference voltages.

A common controller providing both the first and second control signals, allows the first and second dynamic braking units to be centrally controlled in a coordinated manner. Alternatively, separate controllers may be used, provided that a link is provided between the controllers such that the first and second control signals are also issued in a coordinated manner.

In some embodiments, the controller is further configured to: determine a first measurement, using a first measurement instrument, wherein the first measurement comprises the first current, second current and/or the third current; and then adapt the control of the first and second dynamic braking units, based on the first measurement.

The first measurement instrument may be a current or voltage measurement device, for instance. The first measurement may be a direct current measurement, or a measurement from which a current can be calculated or determined. By determining the first measurement, a feedback loop is created by the controller. Put differently, the controller can be made aware of whether control of the dynamic braking units is having the desired effect. Based on the measurement, the control of the dynamic braking units can be adjusted. A direct effect of controlling the first and second dynamic braking units can be determined by measuring the first and second current directly. However, a closed loop feedback mechanism is achieved instead by measuring the third current on the neutral arrangement (which may represent a current in a ground path or surge arrestor path, for instance).

According to a second aspect of the invention, there is provided a bipole power transmission network, comprising: a first power conversion means having a first alternating current (AC) side and a first direct current (DC) side, the first AC side for connecting to a first AC network; a second power conversion means having a second AC side and a second DC side, the second AC side for connecting to a second AC network; first and second power transmission means and a neutral arrangement, the first and second power transmission means interconnecting the first and second DC sides of the first and second power conversion means, thereby allowing the transfer of power between the first and second power conversion means; wherein the first power conversion means, second power conversion means, and the first power transmission means, together define a first transmission pole, and wherein the first power conversion means, second power conversion means, and the second power transmission means, together define a second transmission pole; wherein the bipole power transmission network further comprises the dynamic braking system of the first aspect of the invention, wherein the first dynamic braking unit is electrically connected between the first transmission pole and the neutral arrangement, and wherein the second dynamic braking unit is electrically connected between the second transmission pole and the neutral arrangement.

As hereinbefore discussed, providing the dynamic braking system of the first aspect of the invention within a bipole power transmission network tends to avoid the scenario that currently exists in the prior art, wherein a loss/fault in a return path causes unbalanced current in a transient event to flow through the neutral arrangement to ground or through a surge arrestor, causing environmental harm or tripping the HVDC transmission scheme entirely.

In some embodiments, the first AC network is a renewable power generation network. In even more preferred embodiments, the renewable power generation network is a renewable power generation network selected from the list of renewable power generation networks consisting of: a wind-power generation network; a solar-power generation network; and a bio-power generation network.

In even more embodiments the neutral arrangement comprises a dedicated metallic return (DMR) conductor.

A bipole power transmission network is advantageous because it offers redundancy. Provision of a DMR conductor enables the bipole power transmission network to accept unbalanced current (steady state or transient) as hereinbefore discussed. Hence in bipole power transmission networks comprising dedicated metallic return conductors, the network may be configured to ride-through transient imbalances of currents on the first and second pole transmission lines by allowing unbalanced current to flow through the return path. These networks are however at risk of unbalanced current flowing through other components of their neutral arrangements when the metallic return path fails. Hence providing an ability to reduce the unbalanced current (third current) to zero, tends to provide assurance that the transmission network scheme won't be tripped or be at risk of causing currents to flow through earth to the environment, when the metallic return path fails or is unavailable.

According to a third aspect of the invention, there is provided a computer implemented method of operating a dynamic braking system in a bipole power transmission network, the dynamic braking system comprising a first dynamic braking unit electrically connectable between a first transmission pole and a neutral arrangement of a bipole power transmission network, and a second dynamic braking unit electrically connectable between a second transmission pole and the neutral arrangement of the bipole power transmission network, wherein the first and second dynamic braking units are controllable in-use to regulate respective first and second electrical currents flowing through the first and second dynamic braking units between the first and second transmission poles and the neutral arrangement, the method comprising: determining an operating state of the bipole power transmission network; determining, based on the operating state, whether a third current, equal to the difference between the first and second currents, is permitted to flow through the neutral arrangement; and then controlling the first and second dynamic braking units to: operate independently of each other, if the third current is determined to be permitted to flow through the neutral arrangement; operate in coordination with each other to balance the first current with the second current, such that the third current is substantially zero, if the third current is determined not to be permitted to flow through the neutral arrangement.

According to a fourth aspect of the invention, there is provided a computer program comprising computer-readable instructions which when executed by a controller of a dynamic braking system, cause the controller to perform the method of the third aspect of the invention.

According to a fifth aspect of the invention, there is provided a non-transitory computer-readable medium comprising the computer program of the fourth aspect of the invention.

According to a sixth aspect of the invention, there is provided a controller for a dynamic braking system, comprising: a memory; and at least one processor; wherein the memory comprises computer-readable instructions which when executed by the at least one processor cause the controller to perform the method of the third aspect of the invention.

It will be appreciated that particular features of different aspects of the invention share the technical effects and benefits of corresponding features of other aspects of the invention. More specifically, the bipole power transmission network comprising the dynamic braking system of the invention, shares the technical effects and benefits of the dynamic braking system hereinbefore discussed. Furthermore, the computer implemented method of the invention and the controller performing the computer implemented method of the invention share the same technical effects and benefits as the dynamic braking system of the invention.

It will also be appreciated that the use of the terms "first" and "second", and the like, are merely intended to help distinguish between similar features (for instance the first and second dynamic braking units) and are not intended to indicate a relative importance of one feature over another, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only and with reference to the accompanying drawings, in which.

DETAILED DESCRIPTION

Figure 1:
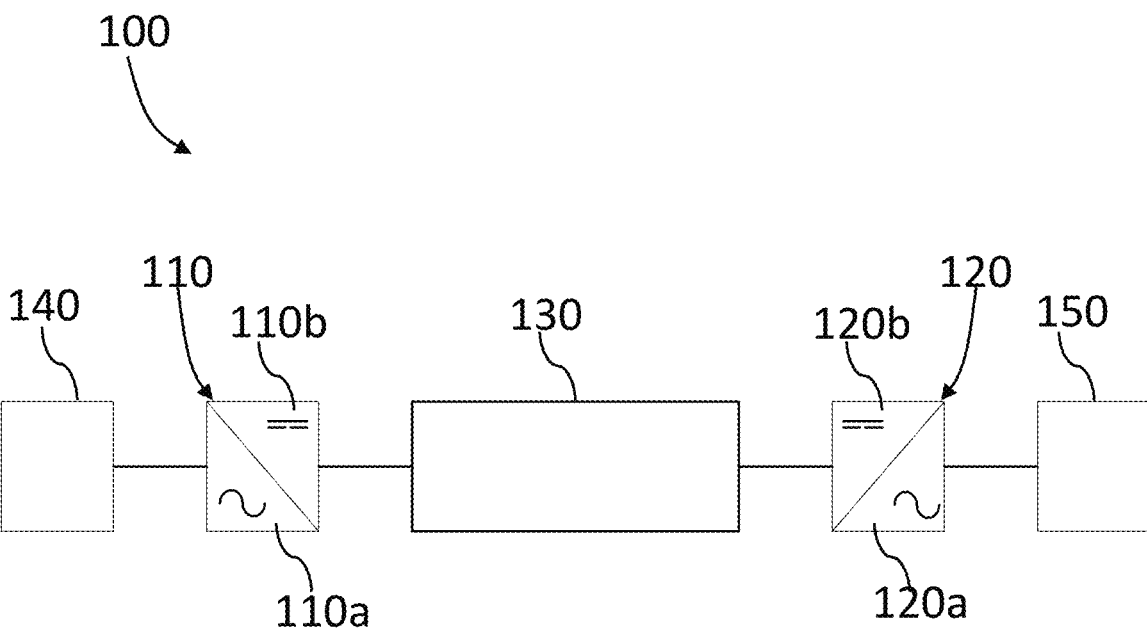
FIG. 1 illustrates generically, an example of a power transmission system.

FIG. 1 illustrates generically, an example of a power transmission system 100. The illustration is not intended to be limited to representing a particular power transmission scheme, such as a monopole or bipole HVDC transmission network, but is moreover provided as a generic example illustrating principles of operation of a power transmission network that is useful for understanding the invention. In this manner, the power transmission system 100 may represent, generically, a monopole or bipole scheme, or may represent a multiterminal power transmission scheme, for instance. Hence, whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the system 100 and herein discussed can be applied to the transmission network 200 of FIGS. 2A, 2B and to the transmission network 300 of FIG. 3.

The power transmission system 100 illustrates a first power conversion means 110 (also known as a converter station) and a second power conversion means 120. The power conversion means 110, 120, convert AC power to DC power (and vice versa), acting essentially as a rectifier (when converting AC power to DC power for transmission) and an inverter (when receiving DC power and converting to AC power). The power conversion means 110, 120, may each comprise a single converter in the case of a monopole system, or two converters in the case of a bipole system. The power conversion means 110, 120, may represent a plurality of converter stations arranged as a multi-terminal power transmission system. Generically, the first power conversion means 110 comprises a first AC side 110a and a first DC side 110b. Generically, the second power conversion means 120 comprises a second AC side 120a and a second DC side 120b.

The first power conversion means 110 is connected to a first AC network 140. The first AC network 140 is connected to the first AC side 110a of the first power conversion means 110. The first AC network 140 may be a power-generation network, which may be a renewable-power generation network such as a wind-power generation network, solar-power generation network, bio-power generation network, for instance.

The second power conversion means 120 is connected to a second AC network 150. The second AC network 150 is connected to the second AC side 120a of the second power conversion means 120. The second AC network 150 may be a consumer network for instance. It will be appreciated that in the alternative, the first AC network 140 may be a consumer network and the second AC network 150 may be a power-generation network.

Also illustrated is a power transmission medium 130 interconnecting the first power conversion means 110 and the second power conversion means 120. The power transmission medium 130 is connected between the first DC side 110b of first power conversion means 110 and the second DC side 120b of the second power conversion means 120. The power transmission medium 130 may comprise electrical cables and other electrical components interconnecting the first and second power conversion means 110, 120. For instance, the power transmission medium 130 may comprise a conductor providing a first electrical pole and/or a conductor providing a second electrical pole. A neutral arrangement may also be provided interconnecting the first and second power conversion means 110, 120. The power transmission medium 130 provides the medium through which DC power is transmitted between the first and second power conversion means 110, 120.

The operation of the power transmission system 100 can be generically described as follows. The first AC power generation network 140 generates AC power that is provided to first power conversion means 110 at the first AC side 110a. The first power conversion means 110 converts the received AC power to a DC power for transmission to second power conversion means 120. The DC power is transmitted from first DC side 110b over the power transmission medium 130 to the second DC side 120b of second power conversion means 120. The second power conversion means 120 converts the received DC power back to AC power. The AC power is then provided from the second AC side 120a to the second AC network 150 for consumption. In particular examples, the power conversion means 110 and 120 may be geographically remote from each other. For instance, the first power conversion means 110 may reside with an off-shore wind farm and the second power conversion means 120 may reside on-shore.

It will be appreciated that various other electrical components may be located at any particular location or with any particular feature/component in the example 100. These may include switches, transformers, resistors, reactors, surge arrestors, harmonic filters and other components well known in the art.

It will be appreciated that converters or power conversion means may comprise a number of different technologies such as current source converters (for instance utilizing Thyristor valves) or voltage source converters (for instance using insulated gate bipolar transistor (IGBT) valves). Such converters may generally be considered to use 'power electronics'.

It will be appreciated that cables used as power transmission mediums may comprise the following non-limiting examples of crosslinked polyethylene (XLPE) and/or mass impregnated (MI) insulation cables. Such cables may comprise a conductor (such as copper or Aluminium) surrounding by a layer an insulation. Dimensions of cables and their associated layers may be varied according to the specific application (and in particular, operational voltage requirements). Cables may further comprise strengthening or 'armouring' in applications such as subsea installation.

Figure 2A:
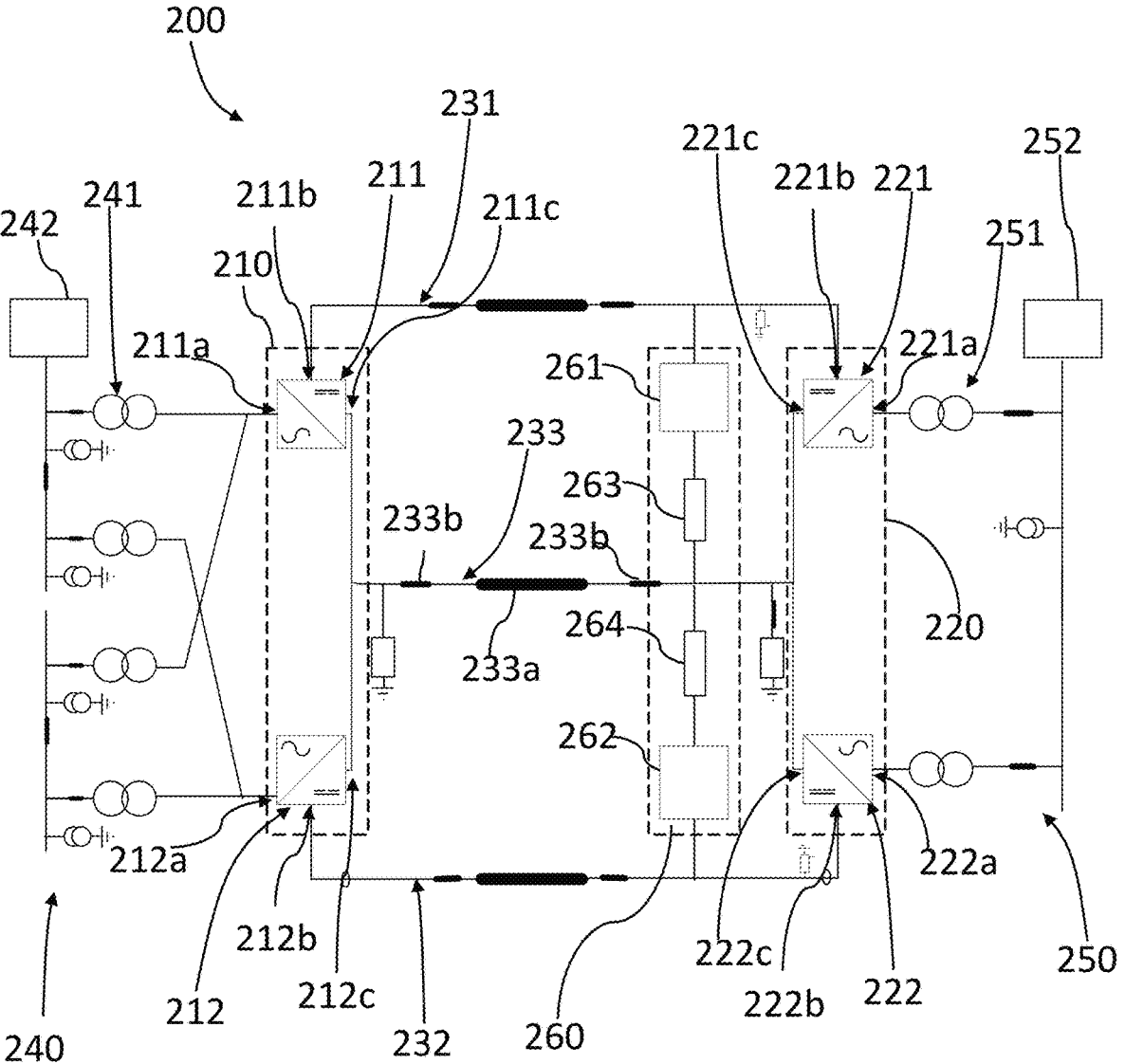
FIG. 2A illustrates a schematic view of a bipole power transmission network with a DMR available.

FIG. 2A illustrates a schematic view of a bipole power transmission network 200 that is useful for understanding the invention.

The bipole power transmission network 200 comprises a first power conversion means 210. The first power conversion means 210 comprises two converters 211, 212. The first power conversion means 210 has a first AC side represented by the first AC side terminals 211a, 212a of the two converters 211, 212. The first power conversion means 210 has a first DC side represented by the first DC side terminals 211b, 212b, 211c, 212c of the two converters 211, 212. The first AC sides 211a, 212a are connected to a first AC network 240 via transformers 241. As illustrated, the first AC network 240 constitutes a wind-power generation network. A point of common connection 242 is illustrated for completeness.

The bipole power transmission network 200 comprises a second power conversion means 220. The second power conversion means 220 comprises two converters 221, 222. The second power conversion means 220 has a second AC side represented by the second AC side terminals 221a, 222a of the two converters 221, 222. The second power conversion means 220 has a second DC side represented by the second DC side terminals 221b, 222b, 221c, 222c of the two converters 221, 222. The second AC sides 221a, 222a are connected to a second AC network 250 via transformers 251. The second AC network 250 constitutes a consumer network. For completeness, a point of common connection 252 is also illustrated for the second AC network 250.

The first conversion means 210 and the second conversion means 220 are connected to each other via a first 231 and second 232 power transmission means and a neutral arrangement 233.

More specifically, the first power transmission means 231 interconnects a terminal 211b on the first DC side of converter 211 in first power conversion means 210, with a terminal 221b on the second DC side of converter 221 in second power conversion means 220. In addition, the second power transmission means 232 interconnects a terminal 212b on the first DC side of converter 212 in first power conversion means 210, with a terminal 222b on the second DC side of converter 222 in second power conversion means 220. The common neutral arrangement 233 is connected between further terminals 211c, 212c, 221c, 222c on the DC sides of the converters 211, 212, 221 and 222.

In the configuration illustrated, the converter 211 of first power conversion means 210, the converter 221 of second power conversion means 220, and the first power transmission means 231, together define a first transmission pole.

In the configuration illustrated, the converter 212 of first power conversion means 210, the converter 222 of second power conversion means 220, and the second power transmission means 232, together define a second transmission pole.

The bipole power transmission network 200 further comprises a dynamic braking system 260. The dynamic braking system 260 comprises a first dynamic braking unit 261 electrically connected between the first transmission medium 231 (defining the first transmission pole) and the neutral arrangement 233. The first dynamic braking unit 261 controls the dissipation of energy through a first resistor 263. The dynamic braking system 260 also comprises a second dynamic braking unit 262 electrically connected between the second transmission medium 232 (defining the second transmission pole) and the neutral arrangement 233. The second dynamic braking unit 262 controls the dissipation of energy through a second resistor 264. It should be noted that the resistors 263 and 264 are illustrated as separate to the dynamic braking units 261 and 262 for the purposes of understanding the operation of the dynamic braking system 260. The resistors 263 and 264 may represent the equivalent resistance of the dynamic braking units 261 and 262 themselves (for instance the valves), additional resistors, or a combination thereof.

The bipole power transmission network 200 also comprises a DMR conductor 233a and associated switches 233b on the neutral arrangement. In the example 200 shown, the switches 233b render the DMR 233a available. Similar returns and switches are illustrated on the first and second transmission mediums 231, 232 but will not be discussed further herein. Other electrical symbols illustrated in the figure such as arrestors and earth connections will be well understood by the person skilled in the art.

The traditional operation of the bipolar power transmission network 200 will now be briefly discussed with reference to the transmission of power from a windfarm.

In normal use of the bipolar power transmission network 200, the two transmission poles are fed through independent wind power parks. This can lead to different power outputs being produced, depending on the wind density in the respective wind power parks. This results in an unbalanced power flow on the two transmission poles. Put differently, a first current experienced on first transmission medium 231 will be different to a second current experienced on second transmission medium 232.

The first and second dynamic braking system units 261 and 262 are triggered and then operated independently to dissipate some energy into resistors 263 and 264.

It should be noted that the independent operation of the first and second dynamic braking system units 261 and 262 is defined by fault ride-through profiles defined in standard Grid codes. A third current, representing the difference between the current flowing through the dynamic braking system units 261 and 262, may resultantly flow onto the neutral arrangement 233 and through the DMR conductor 233a. In the example 200 illustrated, the system 200 can essentially ride through the temporary power imbalance (and steady state imbalances), by allowing any unbalanced current to flow.

The approach to dynamic braking discussed with reference to the example 200 in FIG. 2A tends not to be sufficient in scenarios where there is a loss or a fault associated with the DMR conductor 233a. In such a scenario, the transmission scheme may be switched to either a rigid bipole or a bipole with both power conversion means 210 and 220 grounded. In such a scenario, it is desirable to reduce the current that would have flowed on the return path (i.e. on the neutral arrangement 233) to close to zero. Thus, the currents on the first transmission pole (represented by first transmission medium 231) and the second transmission pole (represented by second transmission medium 232) are to be balanced, for both steady state operation, and temporary operation. Such a scenario will be discussed with respect to FIG. 2B.

Figure 2B:
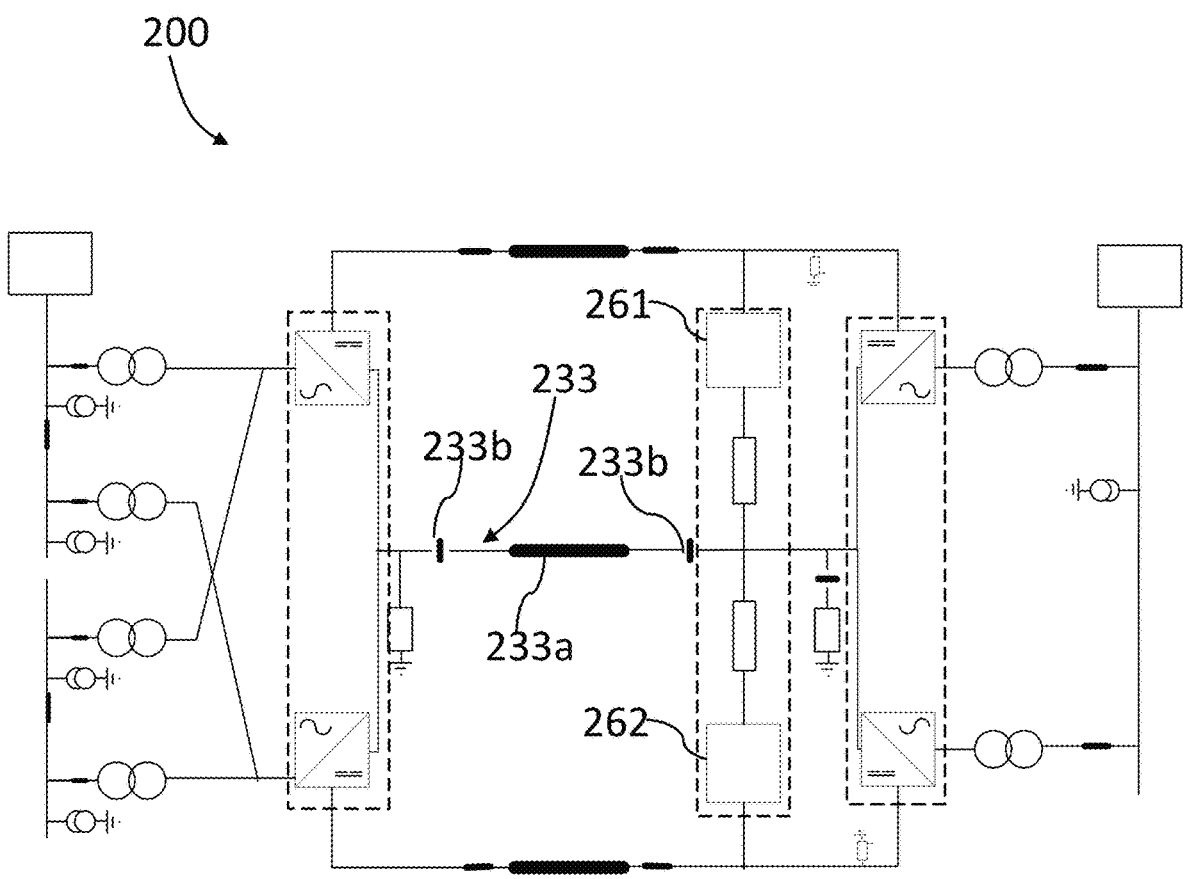
FIG. 2B illustrates a schematic view of a bipole power transmission network without a DMR available.

FIG. 2B illustrates a schematic view of the bipole power transmission network 200 of FIG. 2A. However, the DMR conductor 233a in the example shown has developed a fault and the associated switches 233b on the neutral arrangement 233 have been opened. Any unbalanced current cannot flow through the DMR conductor 233a.

The scenario presented in FIG. 2B can lead to unbalanced current flowing through the neutral arrangement to an earth connection, tripping the entire transmission scheme. Furthermore, current flowing to earth can have undesirable environmental consequences. Compounding the problem is that unbalanced current may also flow through surge arrestors on the neutral arrangement 233, raising the neutral potential and again tripping the entire transmission scheme. Whilst the tolerance of a given transmission scheme to varying levels of unbalanced current and neutral potential may depend on the protection settings of the transmission scheme, it will be understood that the above-mentioned consequences are nonetheless, undesirable.

The inventors have realized that a solution to this problem is to allow for operation of the dynamic braking units 261 and 262 in a coordinated manner when an unbalanced current is not permitted. Such a solution will now be discussed, with reference to the circuitry illustrated in FIG. 3.

Figure 3:
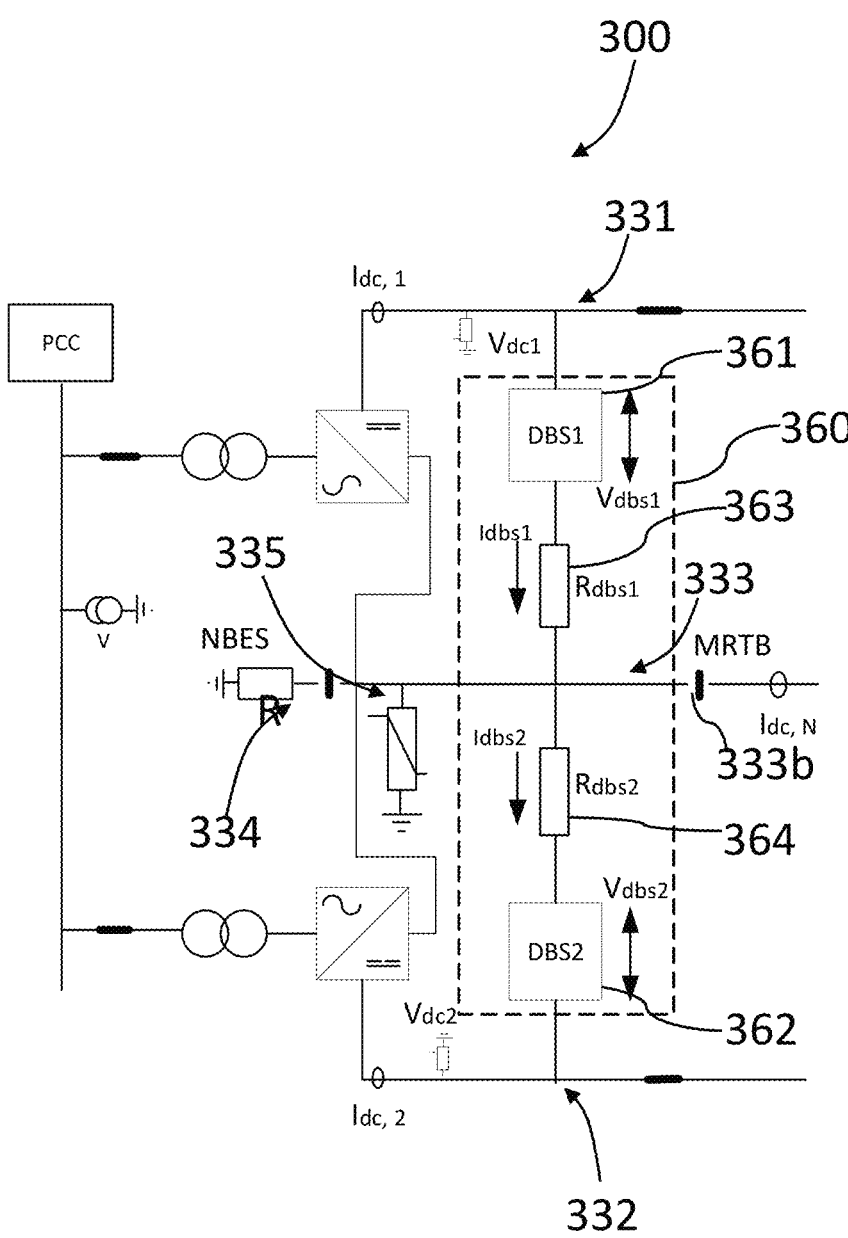
FIG. 3 illustrates a schematic view of an embodiment of a dynamic braking system in part of a bipole power transmission network.

FIG. 3 illustrates a schematic view of an embodiment of a dynamic braking system 360 in part of a bipole power transmission network 300. The bipole power transmission network 300 may be the network 200 of FIG. 2A or 2B.

The dynamic braking system 360 comprises a first dynamic braking unit 361 (also referred to in the figure as DBS1) electrically connected between a first transmission pole (represented by first transmission medium 331) and a neutral arrangement 333 of the bipole power transmission network 300. The first dynamic braking unit 361 is controllable in-use to regulate a first electrical current 'Idbs1' flowing between the first transmission pole (represented by first transmission medium 331) and the neutral arrangement 333, through the first dynamic braking unit 361 and first resistor 363 (having resistance 'Rdbs1'). The first resistor 363 is illustrated as a separate component for the purposes of understanding the invention—it may represent the equivalent resistance of the dynamic braking unit 361 (for instance the valves therein) or may represent a separate resistive load as part of the dynamic braking unit 361 of a combination thereof.

The dynamic braking system 360 is also illustrated as comprising a second dynamic braking unit 362 electrically connected between a second transmission pole (represented by second transmission medium 332) and the neutral arrangement 333 of the bipole power transmission network 360. The second dynamic braking unit 362 is controllable in-use to regulate a second electrical current 'Idbs2' flowing between the second transmission pole (represented by second transmission medium 332) and the neutral arrangement 333 through the second dynamic braking unit 362 and second resistor 364 (having resistance 'Rdbs2'). The second resistor 364 is illustrated as a separate component for the purposes of understanding the invention—it may represent the equivalent resistance of the dynamic braking unit 362 (for instance the valves therein) or may represent a separate resistive load as part of the dynamic braking unit 362 of a combination thereof.

A controller (not illustrated) is arranged in operative communication with the first and second dynamic braking units 361 and 362. The controller may comprise a memory and at least one processor. The memory may comprise computer-readable instructions which when executed by the at least one processor, cause the controller to: determine an operating state of the bipole power transmission network 300; determine, based on the operating state, whether a third current, equal to a difference between the first current Idbs1 and second current Idbs2, is permitted to flow through the neutral arrangement 333; and control the first and second dynamic braking units 361 and 362 accordingly.

The controller operates the dynamic braking units 361 and 362 independently of each other, if the third current is determined to be permitted to flow through the neutral arrangement 333, based on the operating state of the bipole power transmission network 300. For instance, this may be the case in FIG. 2A where the DMR 233a is available and the associated switchgear 233b is closed.

However, in the case of FIG. 2B wherein the DMR 233a is not available, and/or for instance the associated switchgear 233b (or in FIG. 3, 333b) is in the open position, the controller operates the dynamic braking units 361 and 362 in coordination with each other to balance the first current Idbs1 with the second current Idbs2, such that the third current is substantially zero.

The balancing of the first current Idbs1 with the second current Idbs2 shall now be explained mathematically. It will be understood that to balance the currents, Idbs1 must equal Idbs2 as shown in Equation 1.

$$I_{dbs1} = I_{dbs2} \qquad \text{Equation 1}$$

Furthermore, Idbs1 and Idbs2 can be expressed in accordance with Equations 2 and 3 respectively, wherein Vdbs1 and Vdbs2 are the back-emf produced by the first dynamic braking unit 361 and the second dynamic braking unit 362, respectively, wherein Rdbs1 and Rdbs2 are the equivalent resistances of the dynamic braking units/circuits 361 and 362, and wherein Vdc1 and Vdc2 are the DC voltages on the first transmission means 331 and the second transmission means 332.

$$I_{dbs1} = \frac{(V_{dc1} - V_{dbs1})}{R_{dbs1}} \qquad \text{Equation 2}$$

$$I_{dbs2} = \frac{(V_{dc2} - V_{dbs2})}{R_{dbs2}} \qquad \text{Equation 3}$$

The desired common current Idbs through the first and second dynamic braking units 361 and 362 can be calculated based on the energy/power 'P' to be dissipated. This is shown in Equation 4.

$$I_{dbs} = \sqrt{\frac{P}{(R_{dbs1} + R_{dbs2})}} \qquad \text{Equation 4}$$

Moreover, combining Equations 1-3, the relationship in Equation 5 is apparent.

$$I_{dbs} = \frac{(V_{dc1} - V_{dbs1})}{R_{dbs1}} = \frac{(V_{dc2} - V_{dbs2})}{R_{dbs2}} \qquad \text{Equation 5}$$

Therefore, combining these equations it is possible derive Vdbs1 and Vdbs2 as set out in Equations 6 and 7.

$$V_{dbs1} = V_{dc1} - (I_{dbs} * R_{dbs1}) \qquad \text{Equation 6}$$

$$V_{dbs2} = V_{dc2} - (I_{dbs} * R_{dbs2}) \qquad \text{Equation 7}$$

It therefore becomes possible to treat the first and second dynamic braking units 361 and 362 as voltage sources. By controlling the voltages Vdbs1 and Vdbs2 as per Equations 6 and 7, a third current equivalent to the difference between the first current Idbs1 and second current Idbs2 will tend to always be zero, during operation of the dynamic braking system 360. Hence the current flowing through the neutral arrangement 333 through the station ground 334 (also illustrated as NBES) if the associated switch is closed, will tend to be zero. Furthermore, the current flowing through the neutral arrangement 333 and through the neutral surge arrestors 335 if as illustrated, the switch associated with the station ground 334 is open, will also tend to be zero.

By way of a non-limiting example, useful for understanding the operation of a dynamic braking unit, the dynamic braking unit may be considered to comprise a plurality of sub-modules that can be managed as a controllable voltage source. Each submodule may have an associated one or more capacitors and a switch. Controlling the switching in and out of the sub-module capacitors from the dynamic braking circuits, allows an overall voltage of a dynamic braking unit to be controlled. In this way, the instantaneous current (for instance Idbs1 or Idbs2) in the equivalent braking resistance (for instance Rdbs1 or Rdbs2) is determined by the difference between the DC bus voltage (for instance Vdc1 or Vdc2) and the cumulative voltage produced by the sub-modules (for instance Vdbs1 or Vdbs2).

Figure 4:
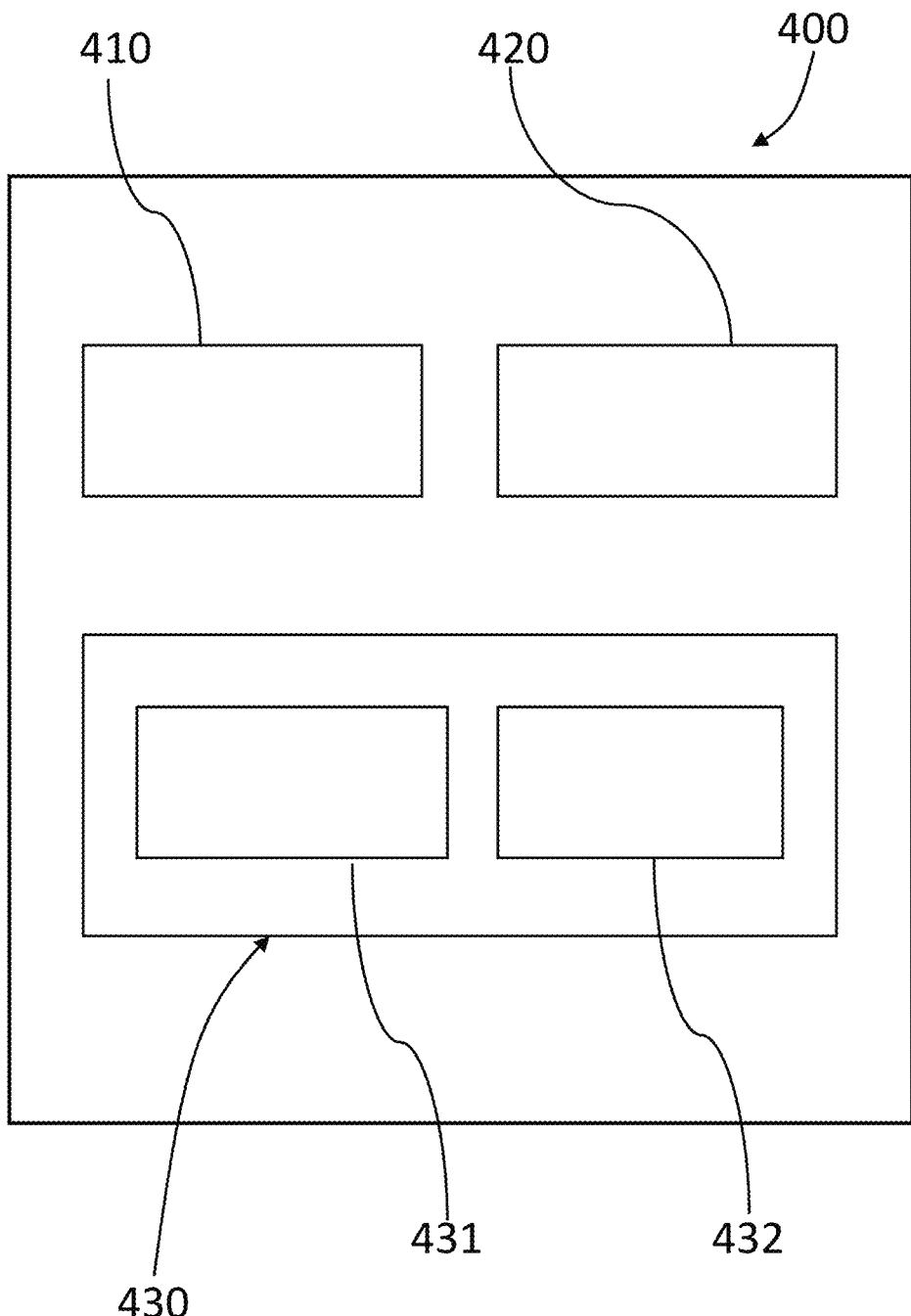
FIG. 4 illustrates an embodiment of a controller as may be used in the dynamic braking system of FIG. 3.

FIG. 4 illustrates an embodiment of a controller 400 as may be used in implementing the invention described herein (for instance for use in the dynamic braking system 360 of FIG. 3).

The controller 400 comprises a memory 410 and at least one processor 420. The memory 410 comprises computer-readable instructions, which when executed by the at least one processor 420, cause the controller 400 to perform the inventive method(s) described herein.

The controller 400 comprises a transceiver arrangement 430 which may comprise a separate transmitter 431 and receiver 432. The transceiver arrangement 430 may be used to operatively communicate with other components or features of embodiments described herein either directly or via a further interface such as a network interface. The transceiver arrangement 430 may for instance send and receive control signals using transmitter 431 and receiver 432. The control signals may contain or define electrical control parameters such as reference currents or reference voltages.

The at least one processor 420 is capable of executing computer-readable instructions and/or performing logical operations. The at least one processor 420 may be a microcontroller, microprocessor, central processing unit (CPU), field programmable gate array (FPGA) or similar programmable controller. The controller may further comprise a user input device and/or output device. The processor 420 is communicatively coupled to the memory 410 and in certain embodiments, the transceiver 430.

The memory 410 may be a computer readable storage medium. For instance, the memory 410 may include a non-volatile computer storage medium. For example, the memory 410 may include a hard disk drive, flash memory etc.

The controller 400 may additionally include a user input device interface and/or a user output device interface, which may allow for visual, audible or haptic inputs/outputs. Examples include interfaces to electronic displays, touch-screens, keyboards, mice, speakers and microphones.

Figure 5:
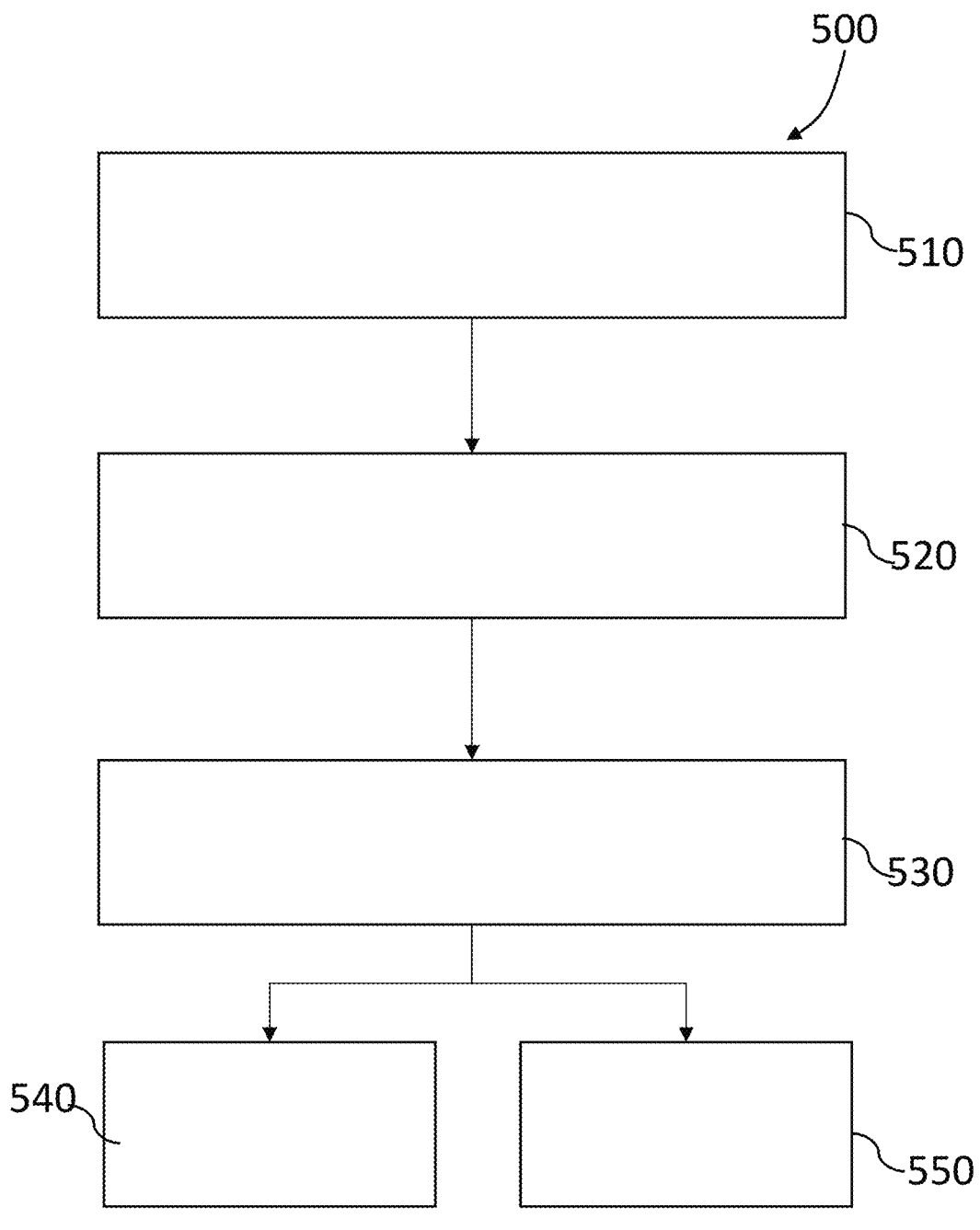
FIG. 5 illustrates an embodiment of a method of operating a dynamic braking system in a bipole power transmission network.

FIG. 5 illustrates an embodiment of a computer-implemented method 500 of operating a dynamic braking system in a bipole power transmission network.

The dynamic braking system comprises a first dynamic braking unit electrically connectable between a first transmission pole and a neutral arrangement of a bipole power transmission network, and a second dynamic braking unit electrically connectable between a second transmission pole and the neutral arrangement of the bipole power transmission network, wherein the first and second dynamic braking units are controllable in-use to regulate respective first and second electrical currents flowing through the first and second dynamic braking units between the first and second transmission poles and the neutral arrangement.

A first step 510 of the method 500 comprises determining an operating state of the bipole power transmission network.

A further step 520 of the method 500 comprises determining, based on the operating state, whether a third current, equal to the difference between the first and second currents, is permitted to flow through the neutral arrangement.

A further step 530 comprises controlling the first and second dynamic braking units.

The further step 530 of controlling the first and second dynamic braking units comprises operating 540 the dynamic braking units independently of each other, if the third current is determined to be permitted to flow through the neutral arrangement.

The further step 530 of controlling the first and second dynamic braking units comprises operating the dynamic braking units in coordination with each other to balance the first current with the second current, such that the third current is substantially zero, if the third current is determined not to be permitted to flow through the neutral arrangement.

The computer-implemented method 500 in effect, determines whether to operate a first and second dynamic braking unit on respective transmission poles of a bipole power transmission network, in coordination with each other (i.e. not independently) based on an operating state of the bipole power transmission network.

The aspects and embodiments of the invention described tend to have the advantage of avoiding the scenario that currently exists in the prior art, wherein a loss/fault in a return path of a bipole power transmission network causes unbalanced current in a transient event to flow through the neutral arrangement to ground or through a surge arrestor, causing environmental harm or tripping the transmission scheme entirely. This tends to be particularly relevant for high voltage DC transmission schemes and in particular schemes where transmission of power from renewable power generation sources is required (such as off-shore windfarms).

As will be appreciated by one skilled in the art, aspects of the invention may be embodied as a system, apparatus, method, or program product.

Reference throughout this specification to an example of a particular method or apparatus, or similar language, means that a particular feature, structure, or characteristic described in connection with that example is included in at least one implementation of the method and apparatus described herein. The terms "including", "comprising", "having", and variations thereof, mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one, and only one, of any single item in the list. For example, "one of A, B and C" includes only A, only B or only C and excludes combinations of A, B and C. As used herein, "a member selected from the group consisting of A, B, and C" includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics described herein may be combined in any suitable manner. In the description provided herein, numerous specific details are provided, to provide a thorough understanding of the disclosure. One skilled in the relevant art will recognize, however, that the disclosed methods and apparatus may be practiced without one or more of the specific details, or with other methods, components, materials, and so forth. In other instances, well-known structures, materials, or operations are not shown or described in detail to avoid obscuring aspects of the disclosure.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding Figures. Like numbers refer to like elements in all Figures.

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

We claim:

1. A dynamic braking system for a bipole power transmission network, the dynamic braking system comprising:
   a first dynamic braking unit electrically connectable between a first transmission pole and a neutral arrangement of the bipole power transmission network, wherein the first dynamic braking unit is controllable in-use to regulate a first electrical current flowing between the first transmission pole and the neutral arrangement through the first dynamic braking unit;
   a second dynamic braking unit electrically connectable between a second transmission pole and the neutral arrangement of the bipole power transmission network, wherein the second dynamic braking unit is controllable in-use to regulate a second electrical current flowing between the second transmission pole and the neutral arrangement through the second dynamic braking unit; and
   a controller arranged in operative communication with the first and second dynamic braking units, the controller being configured to:
      determine an operating state of the bipole power transmission network;
      determine, based on the operating state, whether a third electrical current is permitted to flow through the neutral arrangement, the third electrical current being equal to a difference between the first electrical current and the second electrical current; and
      control the first and second dynamic braking units to:
         if the third electrical current is determined to be permitted to flow through the neutral arrangement, operate independently of each other; and
         if the third electrical current is determined not to be permitted to flow through the neutral arrangement, operate in coordination with each other to balance the first current with the second current, such that the third current is substantially zero.

2. The dynamic braking system according to claim 1, wherein:

the controller is configured to control the first and second dynamic braking units in response to an activation trigger received from a monitoring unit of the bipole power transmission network.

3. The dynamic braking system according to claim 1, wherein:

the operating state of the bipole power transmission network comprises:

a failure of an electrical component on the neutral arrangement;

an open or closed state of a switchgear on the neutral arrangement;

a measured electric quantity of the bipole power transmission network; and/or a user input from a user interface of the bipole power transmission network.

4. The dynamic braking system according to claim 1, wherein:

the first and second dynamic braking units are configured to provide respective first and second voltages controllable by the controller, for regulating the first and second currents.

5. The dynamic braking system according to claim 4, wherein:

the first and second dynamic braking units comprise respective first and second pluralities of switching devices and first and second pluralities of associated capacitors, wherein the first and second pluralities of switching devices are controllable in response to respective first and second control signals to switch the first and second pluralities of capacitors in order to provide the first and second voltages.

6. The dynamic braking system according to claim 5, wherein:

the controller is configured to control the first and second dynamic braking units by providing the first and second control signals, wherein the first and second control signals preferably comprise respective first and second reference voltages.

7. The dynamic braking system according to claim 1, wherein the controller is further configured to:

determine a first measurement, using a first measurement instrument, wherein the first measurement comprises the first electrical current, the second electrical current and/or the third electrical current; and then adapt the control of the first and second dynamic braking units, based on the first measurement.

8. A bipole power transmission network, comprising:

a first power conversion means having a first alternating current, AC, side and a first direct current, DC, side, the first AC side for connecting to a first AC network;

a second power conversion means having a second AC side and a second DC side, the second AC side for connecting to a second AC network;

a first power transmission means;

a second power transmission means; and a neutral arrangement; wherein the first and second power transmission means interconnect the first and second DC sides of the first and second power conversion means, thereby allowing the transfer of power between the first and second power conversion means;

the first power conversion means, the second power conversion means, and the first power transmission means, together define a first transmission pole;

the first power conversion means, the second power conversion means, and the second power transmission means, together define a second transmission pole; and the bipole power transmission network further comprises the dynamic braking system of any preceding claim, wherein the first dynamic braking unit is electrically connected between the first transmission pole and the neutral arrangement, and wherein the second dynamic braking unit is electrically connected between the second transmission pole and the neutral arrangement.

9. The bipole power transmission network of claim 8, wherein the first AC network is a power generation network.

10. The bipole power transmission network of claim 9, wherein the power generation network is a renewable power generation network selected from the list of renewable power generation networks comprising:

a wind-power generation network;

a solar-power generation network; and a bio-power generation network.

11. The bipole power transmission network of claim 8, wherein the neutral arrangement comprises a dedicated metallic return conductor.

12. A computer implemented method of operating a dynamic braking system in a bipole power transmission network, the dynamic braking system comprising a first dynamic braking unit electrically connectable between a first transmission pole and a neutral arrangement of a bipole power transmission network, and a second dynamic braking unit electrically connectable between a second transmission pole and the neutral arrangement of the bipole power transmission network, wherein the first and second dynamic braking units are controllable in-use to regulate respective first and second electrical currents flowing through the first and second dynamic braking units between the first and second transmission poles and the neutral arrangement, the method comprising:

determining an operating state of the bipole power transmission network;

determining, based on the operating state, whether a third electrical current is permitted to flow through the neutral arrangement, the third electrical current being equal to a difference between the first and second electrical currents; and controlling the first and second dynamic braking units to:

if the third electrical current is determined to be permitted to flow through the neutral arrangement, operate independently of each other; and if the third electrical current is determined not to be permitted to flow through the neutral arrangement, operate in coordination with each other to balance the first electrical current with the second electrical current, such that the third electrical current is substantially zero.

13. A computer program comprising computer-readable instructions which when executed by a controller of a dynamic braking system, cause the controller to perform the method of claim 12.

14. A non-transitory computer-readable medium comprising the computer program of claim 13.

15. A controller for a dynamic braking system, comprising:

a memory; and at least one processor;

wherein the memory comprises computer-readable instructions which when executed by the at least one processor cause the controller to perform the method of claim 12.

* * * * *